United States Patent
Tamir et al.

(10) Patent No.: US 10,462,176 B2
(45) Date of Patent: *Oct. 29, 2019

(54) METHOD AND APPARATUS FOR REDUCING SECURITY RISK IN A NETWORKED COMPUTER SYSTEM ARCHITECTURE

(71) Applicant: ServiceNow, Inc., Santa Clara, CA (US)

(72) Inventors: Giora Tamir, San Diego, CA (US); Lisa Henderson, Temecula, CA (US); Jose Bernal, San Diego, CA (US); Bryan Boyle, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/939,645

(22) Filed: Mar. 29, 2018

(65) Prior Publication Data

US 2018/0219908 A1 Aug. 2, 2018

Related U.S. Application Data

(63) Continuation of application No. 15/096,715, filed on Apr. 12, 2016, now Pat. No. 10,015,186.

(51) Int. Cl.
| | |
|---|---|
| *G06F 21/00* | (2013.01) |
| *H04L 29/06* | (2006.01) |
| *G06F 21/57* | (2013.01) |

(52) U.S. Cl.
CPC ........ *H04L 63/1433* (2013.01); *G06F 21/577* (2013.01); *H04L 63/1441* (2013.01)

(58) Field of Classification Search
CPC .................. H04L 63/1433; H04L 63/1441
See application file for complete search history.

(56) References Cited

U.S. PATENT DOCUMENTS 8,307,444 B1 * 11/2012 Mayer .................. G06F 21/577
  726/22
2006/0101518 A1 5/2006 Schumaker et al.
(Continued)

FOREIGN PATENT DOCUMENTS

JP 2014-174678 A 9/2014

OTHER PUBLICATIONS

B. Coffin, et al.; "SACM Bulnerability Assessment Scenario; draft-coff-sacm-vuln-scenario-00.txt", Internet Engineering Task Force, IETF; StandardWorkingDraft, (ISOC), Oct. 18, 2015; pp. 1-23.
(Continued)

*Primary Examiner* — Beemnet W Dada
(74) *Attorney, Agent, or Firm* — Fletcher Yoder PC

(57) ABSTRACT

An apparatus and associated method are provided for reducing a security risk in a networked computer system architecture. The method comprises receiving at a security computer external vulnerability data from an external source regarding vulnerabilities associated with an attack vector for configuration item (CI) data related to a (CI) device, of the networked computer system. The security computer accesses a configuration management database (CMDB) and the CI data related to the physical device is read. Trust zone data associated with the CI device is determined utilizing the CMDB, and the security computer performs a vulnerability calculation for the CI device utilizing the external vulnerability data and associated trust zone data. This is also done for a second CI device. The vulnerability calculations for both are compared and this comparison serves as a basis for prioritizing an action to be taken on the CI device or associated other network components.

20 Claims, 11 Drawing Sheets

(56) References Cited

U.S. PATENT DOCUMENTS

| | | |
|---|---|---|
| 2010/0192228 A1* | 7/2010 | Levi ................. G06F 21/577 |
| | | 726/25 |
| 2010/0192288 A1 | 7/2010 | Levi |
| 2012/0304300 A1* | 11/2012 | LaBumbard .......... G06F 21/577 |
| | | 726/25 |
| 2015/0040230 A1 | 2/2015 | Oliphant et al. |
| 2015/0302205 A1 | 10/2015 | Milman et al. |
| 2015/0350238 A1 | 12/2015 | Dulkin et al. |
| 2016/0028762 A1* | 1/2016 | Di Pietro ............ H04L 63/1458 |
| | | 726/23 |

OTHER PUBLICATIONS

Office Action for Japanese Application No. 2018-553100 dated Apr. 24, 2019, 4 pgs.

Cvss: "Common Vulnerability Scoring System v3.0: Specification Document", Sep. 22, 2015 (Sep. 22, 2015), XP055551049, retrieved from the Internet: URL: https://web.archive.org/web/20150922051747if_/http://www.first.org/cvss/cvss-v30-specification-v1.7.pdf (retrived on Feb. 4, 2019).

Office Action for European Patent Application No. 17720642.2 dated Mar. 6, 2019 (Mar. 6, 2019); 6 pgs.

\* cited by examiner

Showing other records for: SAP LoadBal01 ⛌

| | Number ▲ | Priority | State | Assigned to | Short description | Task type |
|---|---|---|---|---|---|---|
| ▼ Task type: Change Request (1) | | | | | | |
| ☐ 510 ⓘ CHG0001047 | | 4 - Low | (1) | | Malware infection | Change Request |
| ▼ Task type: Security Incident (2) | | | | | | |
| ☐ 400 ⓘ SIR0001726 | | 4 - Low | Analysis | Joe User | Unauthorized access to information systems | Security incident |
| ☐ 520 ⓘ SIR0001733 | | 4 - Low | Eradicate | Sally Smith | Malware infection | Security incident |
| ▼ Task type: Vulnerable item (4) | | | | | | |
| ☐ ⓘ VIT0000066 | | 4 - Low | New | | CVE-2015-3008 detected. | Vulnerable item |
| ☐ ⓘ VIT0001100 | | 4 - Low | New | | CVE-2015-3008 detected. | Vulnerable item |
| ☐ ⓘ VIT0001213 | | 4 - Low | New | | CVE-2015-0887 detected. | Vulnerable item |
| ☐ 530 ⓘ VIT0005052 | | 4 - Low | New | | CVE-2015-1426 detected. | Vulnerable item |

Actions on selected rows... ⌄      ▼▼ ▼  1 to 3 of 3  ▲ ▲▲

| | Incident | Problem | Security Incident | Vulnerable Item | | | 1 | to 4 of 4 | |
|---|---|---|---|---|---|---|---|---|---|
| | Number | State | Configuration item | | Vulnerability | | | Last found | |
| ⓘ | VIT0005052 | New | SAP LoadBal01 | | CVE-2015-1426 | | | 2015-08-07 | |
| ⓘ | VIT0001213 | New | SAP LoadBal01 | | CVE-2015-0887 | | | 2015-08-07 | |
| ⓘ | VIT0001100 | New | SAP LoadBal01 | | CVE-2015-3008 | | | 2015-08-07 | |
| ⓘ | VIT0000066 | New | SAP LoadBal01 | | CVE-2015-3008 | | | 2015-08-07 | |

FIG. 10

METHOD AND APPARATUS FOR REDUCING SECURITY RISK IN A NETWORKED COMPUTER SYSTEM ARCHITECTURE

CROSS REFERENCE TO RELATED APPLICATION

The present disclosure is a continuation of and claims priority to U.S. patent application Ser. No. 15/096,715, filed on Apr. 12, 2016, the entire contents of which are herein incorporated by reference.

TECHNICAL FIELD

The present disclosure relates in general to techniques and devices for reducing security risk in a networked computer system architecture that takes into account elements of the network structure.

BACKGROUND

Protecting computers from cyberattacks is becoming more and more challenging as the attacks grow more sophisticated. Prioritizing the work of cyber-vulnerability mitigation and remediation is a challenge, as resources are limited and the number of vulnerabilities requiring remediation is usually very high. Furthermore, new vulnerabilities crop up continuously.

SUMMARY

Disclosed herein is an apparatus and related method for reducing a security risk in a networked computer system architecture. According to various implementations discussed below, information about elements of a computer-based network for an organization are stored in a configuration management database (CMDB). The CMDB contains configuration item (CI) records that each contain data about the components making up the network—such components including a computer, computer system, server, router, firewall, etc.).

According to another implementation, an apparatus is provided for reducing a security risk in a networked computer system architecture, comprising a processor, a network interface comprising a communications port connected to a network, a memory accessible by the processor and comprising a security risk module that comprises instructions executable by the processor, a configuration management database that comprises a plurality of configuration item records, each configuration item record comprising data related to components making up the networked computer system, wherein the configuration management database is accessible by the processor, wherein the security risk module comprises instructions that receives, via the network interface, external vulnerability data from a source external to the networked computer system regarding vulnerabilities associated with an attack vector for configuration item (CI) data related to a physical device, defined as a CI device, of the networked computer system, accesses, with the security computer, a configuration management database (CMDB) and reads the CI data related to the physical device, determines, using a processor of the security computer, trust zone data associated with the CI device utilizing the CMDB, performs a vulnerability calculation for the CI device utilizing the external vulnerability data and the trust zone data associated with the CI device, performs a second vulnerability calculation for a second CI device utilizing the external vulnerability data and the trust zone data associated with the second CI device, compares the vulnerability calculation for the CI device with the second vulnerability calculation for a second CI device, and prioritizes an action to be taken on the CI device or an associated other network component based on the comparison.

According to a further implementation, a method is provided for reducing a security risk in a networked computer system architecture, comprising receiving, via a network interface of a security computer, external vulnerability data from a source external to the networked computer system regarding vulnerabilities associated with an attack vector for configuration item (CI) data related to a physical device, defined as a CI device, of the networked computer system, accessing, with the security computer, a configuration management database (CMDB) and reading the CI data related to the physical device, determining, using a processor of the security computer, trust zone data associated with the CI device utilizing the CMDB, performing a vulnerability calculation for the CI device utilizing the external vulnerability data and the trust zone data associated with the CI device, performing a second vulnerability calculation for a second CI device utilizing the external vulnerability data and the trust zone data associated with the second CI device, comparing the vulnerability calculation for the CI device with the second vulnerability calculation for the second CI device, and prioritizing an action to be taken on the CI device or an associated other network component based on the comparison.

According to a further implementation, a non-transitory computer-readable storage medium, comprising executable instructions that, when executed by a processor, facilitate performance of operations for reducing a security risk in a networked computer system architecture, the operations comprising the method described above.

BRIEF DESCRIPTION OF THE DRAWINGS

The description herein makes reference to the accompanying drawings wherein like reference numerals refer to like parts throughout the several views.

FIG. 5 is an implementation of a screen shot showing records related to a selected CI.

FIG. 8 is an implementation of a screen shot showing a filter that can be applied to the displayed records.

FIG. 10 is an implementation of a screen shot showing further records related to a selected CI.

DETAILED DESCRIPTION

It is desirable to prioritize vulnerabilities within a networked computer system so that the limited resources available can be applied in an efficient manner. Although a National Vulnerability Database from the National Institute of Standards and Technology (NIST) exists, as do third-party sources, pre-associated with a severity indicator/criticality, such indicators are based on an application to a standalone device. Known applications do not take into consideration other components related to a particular computer or other device in the network, resulting in a less-than-optimal assessment of the vulnerability and ultimately in an inefficient allocation of resources to resolve the vulnerabilities.

With a large number of vulnerabilities, it is important to properly prioritize the vulnerability. Various implementations utilize information from a configuration management database combined with software asset management data and the externally obtained vulnerability data to more accurately determine the vulnerability so that resources can be more efficiently utilized.

These implementations of the invention are discussed in more detail below, after a discussion of a general structure of a computer network and cloud computing, as well as a general structure of a computer within this network, on which the implementations may be run.

Figure 1:
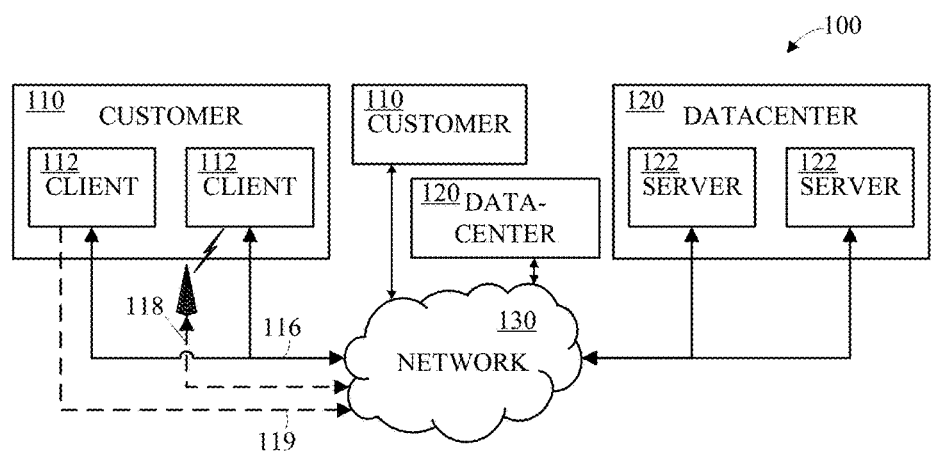
FIG. 1 is a block diagram of an implementation of a networked distributed or cloud computing system in which the teachings herein may be implemented.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system comprising multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g., a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
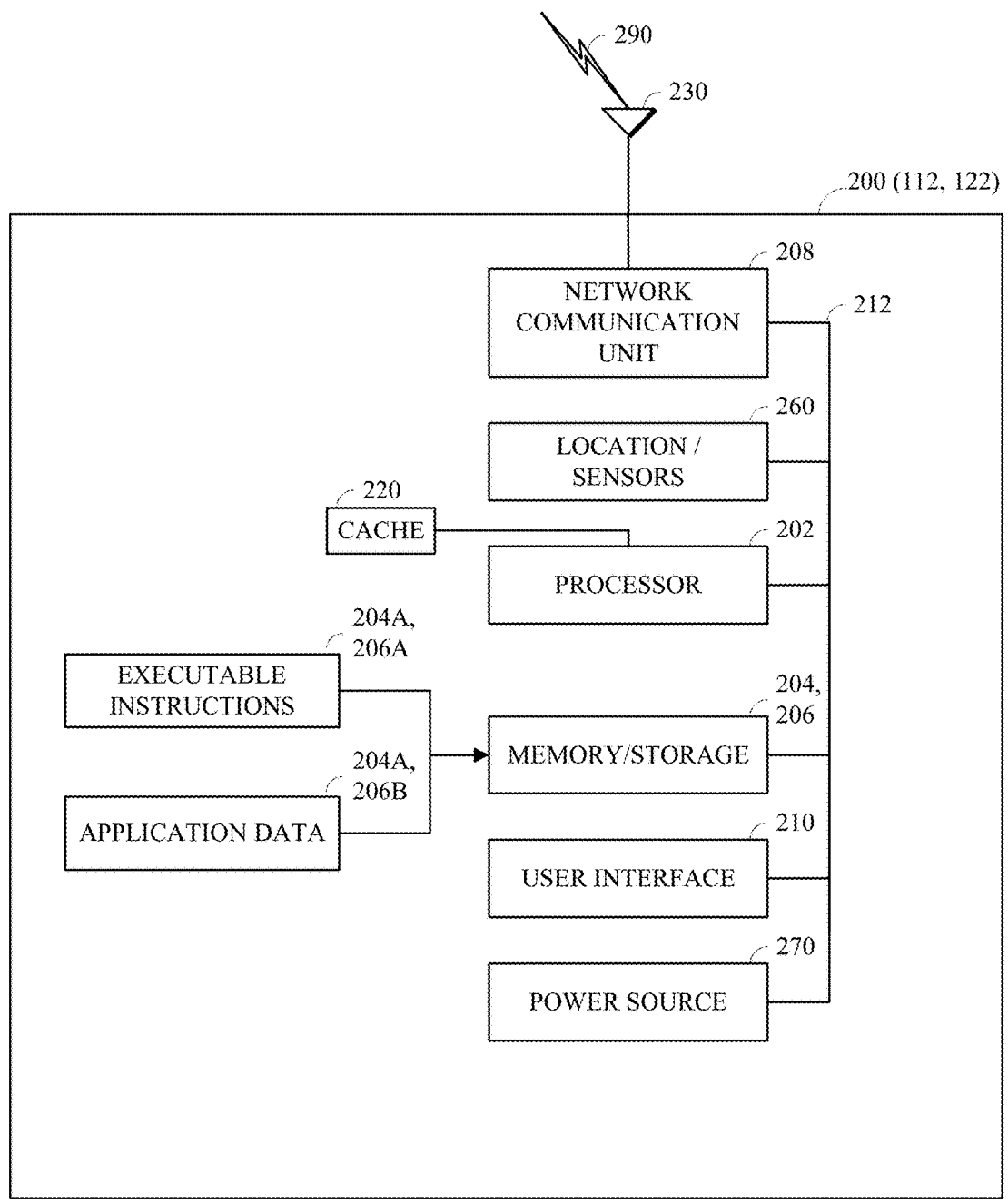
FIG. 2 is a block diagram of an implementation of an internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can comprise a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically includes one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. A disk device, as defined herein, can be an actual disk drive or other forms of storage devices designed to be accessed in a manner similar to an actual disk drive (e.g., flash cards and solid-state disk drives, and the like). Storage 206 can comprise executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 comprises instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can include one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or comprises a display, the display can be implemented in various ways, including by a liquid crystal display (LCD) or a cathode-ray tube (CRT) or light emitting diode (LED) display, such as an OLED display. A structured output of a device can be provided to an input of the display so that the elements provided on the display screen represent the underlying structure of the output data.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

In the computer architecture described above, the use of various tools and processes can beneficially help to determine the severity of potential threats within this architecture and to determine how best to allocate resources to deal with these threats. Vulnerability severity can be determined so that it more closely matches real-world severity, making easier to focus resources on the highest severity vulnerabilities first. It can do this by taking into account the network within which a computer is located, permitting, resources to be allocated in a most efficient manner.

The process utilizes certain features of known processes in that it collects and lists all of the nationally-recognized and third-party vulnerabilities associated with the software installed on a particular computer. Each vulnerability from the National Vulnerability Database and third-party sources comes pre-associated with a severity indicator (also called criticality), which is pre-computed to take into account the prevalence, difficulty to exploit, and possible impact of the vulnerability being exploited.

Figure 3A:
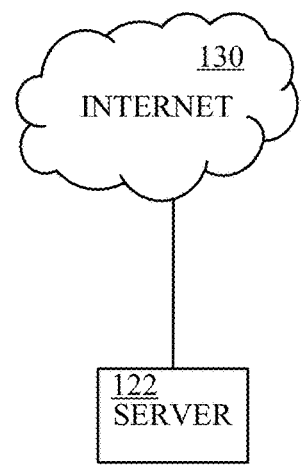
FIG. 3A is a block diagram of a basic network configuration.
Figure 3B:
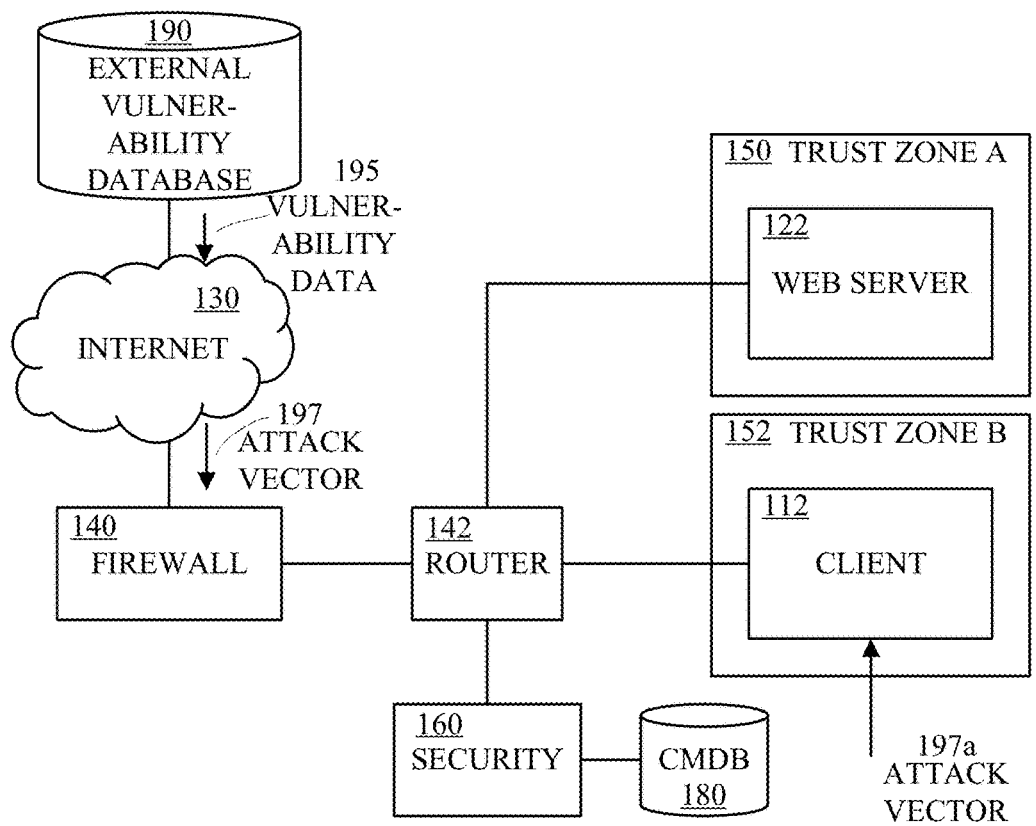
FIG. 3B is a block diagram of an example of a network topology.

As is illustrated in FIG. 3A, which is a block diagram of a basic network configuration, a default severity associated with the vulnerability is done assuming a stand-alone computer 122 connected to the Internet 130. The impact the vulnerability would have on the organization is based on the exploitation of the vulnerability on that stand-alone computer. Referring to FIG. 3B, which is a block diagram of an example of a network topology, vulnerabilities 195, when downloaded from an external source 190, such as the National Vulnerability Database or coming from a third-party source, can be associated with an attack vector and impact scores (such as confidentiality, integrity, and availability). Vulnerabilities 195 can also include other vulnerability data. Each organization has their own weighting for confidentiality, integrity and availability, leading to an organization-specific impact calculation. When examining the attack vector, some require direct network access to the vulnerable machine, some require physical access and some require additional software to be installed on the vulnerable machine. When evaluated in vacuum, the vulnerability severity/impact cannot take the attack vector into account, as the actual network topology, trust-zone assignment, and physical access criteria are unknown at the time of evaluation by the vulnerability database author/contributor.

Specific client installations are significantly more complex than a simple stand-alone machine, which makes the determination of vulnerability impact a less than optimal measure. In the real world, in networked environments, machines are segregated into trust-zones and are protected by a variety of perimeter defenses, trust-zone transition defenses, and end-point protections. Once these additional protections are taken into account, the actual severity of the vulnerability might be significantly reduced or completely eliminated. FIG. 3B illustrates an implementation of the vulnerable computer 112 behind a router 142 and a firewall 140 (perimeter defense) and therefore immune to some attack vectors, lowering the vulnerability impact/severity of some vulnerabilities. Other configurations involving the network architecture are also possible.

Databases containing vulnerability data (e.g., The National Vulnerability Database from NIST) may include associated severity calculations, but these calculations are based on a particular vulnerability being completely stand-alone. The affected CI is in a network full of other components, some of them designed to protect the CI. A significant vulnerability if alone out on the Internet might be a low priority if the affected CI is inside of a protected perimeter. Because the system has access to the CMDB and the network topology, an algorithm can figure out if some vulnerabilities are not as critical because there are protective layers in place. The external input is the vulnerability definitions. As a precursor, the system performs the vulnerability scanning, and the application of the known vulnerabilities to the CIs, iterates through the software, hardware, etc., and determines which vulnerabilities apply. This gives an original risk level, based on the external vulnerability data, and then provides a calculate a context dependent risk based on the network architecture and metadata about the related components therein. Taking this architecture into consideration allows a more precise vulnerability severity score to be calculated, and the severity associated with specific vulnerabilities on specific computers may be reduced, leading to a new prioritization of the remediation work required. Once vulnerabilities are appropriately evaluated, the limited resources available for remediation can be focused on the remediation tasks with the highest risk-reducing impact. By calculating cyber-vulnerability severities and adjusting for client-specific network topologies, vulnerability remediation work can be better prioritized, allowing for a more effective risk-mitigation and risk-remediation process. Using topology-adjusted vulnerability severity scores allows limited resources to focus on the highest priority vulnerabilities remediation tasks.

In an example architecture, information about elements of a computer-based network for an organization are stored in the CMDB 180. In an implementation, security incident response mechanisms 160, which may include a security computer (such as a computer 200, as described earlier) can calculate these vulnerability severity scores for each item or component of the network, represented by a CI data record in the CMDB 180. According to an implementation, based on CMDB information, the network topology and security structure (defining other network component data), and other possible aspects such as trust-zone membership and segregation, perimeter defenses, trust zone transition defenses, and end point protections can be inferred based on CMDB relationships and CMDB data. If available in the CMDB 180, physical access data can be used to calculate the impact of attack vectors 197, 197*a*.

By taking all the information in the CMDB 180 into account, and inferring the network topology (based on the CMDB relationships to the router 142 and other perimeter defense components, such as the firewall 140), the security computer 160 can calculate the ease or difficulty of accessing the vulnerable computer using the specified attack vector 197, 197*a*. As noted in FIG. 3B, an attack vector 197 can occur via the Internet 130, but an attack vector (physical attack vector) 197*a* can also occur via physical access as well (e.g., USB thumb drive). The CMDB 180 may contain information about a specific location of a CI that may be utilized to appropriately discount physical attack vectors as well.

With both the organization specific impact weight calculated and the attack vector/topology combination taken into account, a new severity figure can be associated with the computer and vulnerability combination, storing both the original (inherent) severity and the updated, real-world, (contextual) severity score. As additional computer and vulnerability combinations are evaluated, the updated severity score more closely reflects real-world risk figures, allowing remediation work to focus on the highest risk or highest impact vulnerabilities first. As an additional advantage, the algorithm described above can also be used to measure the net risk reduction associated with specific perimeter defense components, providing a better return-on-investment measure for those components.

By way of example, a laptop computer running Application A on a public wireless connection might be at higher risk of exploitation by a particular attack vector that takes advantage of a bug in Application A, making the laptop susceptible to being controlled by a malicious source. However, if that same laptop is being operated as an office computer, it may be residing behind a firewall and several other layers of protection, thereby reducing the risk of exploitation by that attack vector on Application A.

The system thus relies upon a combination of metadata generated by discovery or by IT personnel entry into the CMDB (this information could include whether a CI is within a datacenter, a trust zone, etc.), and it could also rely on attributes measured about a device. The system then applies rules that might be applicable to certain attack vectors, based upon some predetermined algorithm that is a part of this system. The job of remediation can be initiated by the creation of a task, a change, a problem, or an incident, as discussed below, and may ultimately be handled by the appropriate entity (e.g., HR might handle human problems, the legal department might handle legal issues, the IT department might handle computer/system issues, etc.)

FIG. 3B illustrates the concept of trust zones, showing a Trust Zone A 150, which includes a web server 122, and Trust Zone B 152, which includes a client computer 112. The trust zones relate to zones delineating different devices from among a wide variety of factors. For example, certain delineations may be associated with the network architecture itself (e.g., Zone A being behind a firewall, and thus less susceptible to email viruses, and Zone B not). However, other delineations may relate to the nature of the device itself (e.g., Zone C includes web servers that are susceptible to attack vectors via web-based SQL injection, whereas Zone D includes application servers that are immune to such web-based SQL injections) or physical security associated with the device (e.g., Zone E is a rackmount computer located in a locked server room, and thus very unlikely to be compromised by a USB-drive-injected virus or other exploit, whereas Zone F is a laptop computer that may be taken home by an employee and could easily be compromised by a USB-drive-injected virus or other exploit). In another example, the trust zone can delineate between the nature of the user (e.g., Zone G computers are C-level executive laptops and thus carry very sensitive information, whereas Zone H computers are administrative assistant laptops with limited sensitive information). The trust zones can thus constitute any way for delineating devices based on risk in light of various attack vectors.

With a large number of vulnerabilities, many computers, and limited resources, determining which vulnerabilities to remediate first is a challenge. In one implementation, the vulnerability remediation algorithm determines which remediation would have the most impact (maximize risk reduction) based on vulnerability severity and the number of affected computers. This implementation uses the CMDB 180 data (CIs and software installation records) and the vulnerability data 195 to determine how many computers are affected. The CMDB may be used to describe the hardware installed in a system, including servers, laptops, routers, firewalls, etc.

Most vulnerabilities relate to particular versions of software. So, the CMDB can indicate where the system is, what it is exposed to, what it supports, and what software is installed on it. The vulnerability data indicates that a particular version of software has some possible vulnerabilities.

The product of the vulnerability severity and number of computers affected is then calculated to determine which vulnerability affects the most computers while being the most severe. The calculation is then used to determine the optimal vulnerability remediation order.

Figure 3C:
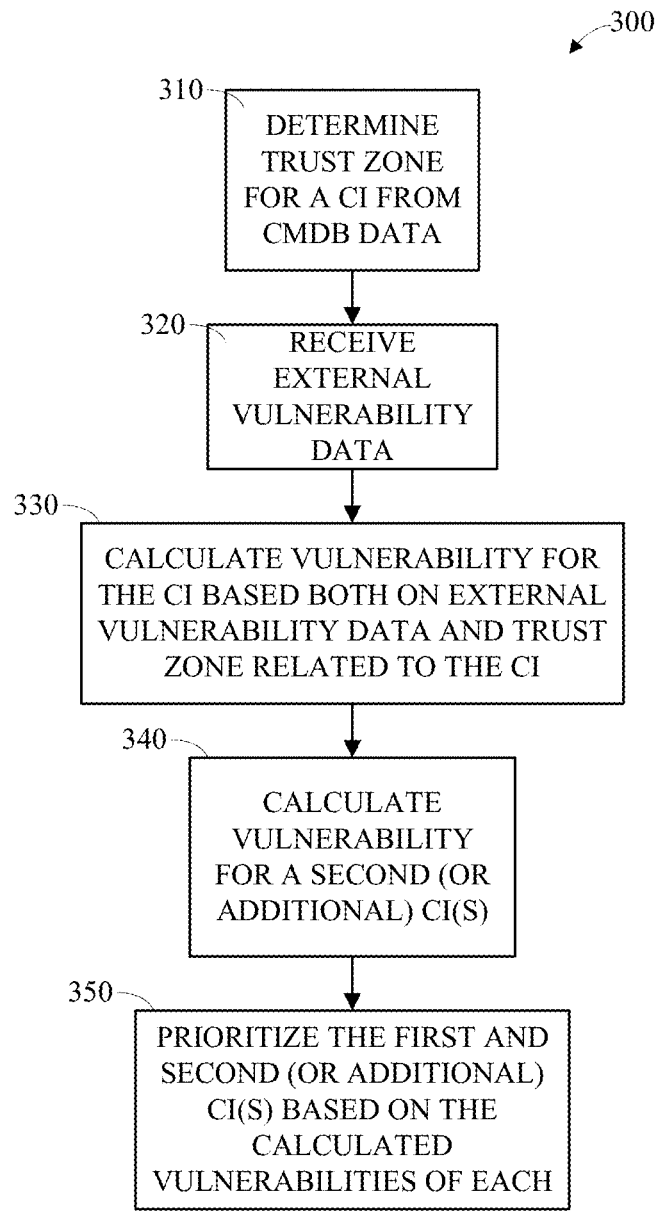
FIG. 3C is a flowchart of an implementation of a process for reducing a security risk.

FIG. 3C is a flowchart illustrating an implementation of a method for prioritizing vulnerability in a networked computer system described above. In operation 310, the trust zone for a CI is obtained or inferred from looking at CMDB data. In operation 320, external vulnerability data is received, and then in operation 330, this data is used to calculate the vulnerability for this CI, but the calculation also includes data associated with the trust zone related to the CI. In operation 340, the process is repeated for a second (or additional) CIs. In operation 350, the vulnerabilities for the first and second (or additional) CI(s) are compared, and a prioritization for handling is determined based on the vulnerability calculations. The prioritization of handling vulnerabilities is done by comparting a vulnerability score to all other scored vulnerabilities.

Vulnerabilities are associated with a severity level. Using the CMDB 180, an item of software installed on a computer 112 is associated with a relevant vulnerability. For example, a specific version of the Adobe Flash Player® is assigned a specific vulnerability. Thus, all computers with this version of the Adobe Flash Player installed, as determined using the CMDB 180 software installation records, are associated with the vulnerabilities knows to be in the specified version of Adobe Flash). Once the computer records are associated with the appropriate vulnerabilities, an exact count of the numbers of computers having each type of vulnerability can be determined.

With both the vulnerability severity and the number of computers affected known, a calculation can be made determining the overall ranking of the vulnerability (associated risk, as determined by the severity and computer count—standing for probability). Once all vulnerabilities are ranked, the top ranking (highest risk) vulnerabilities can be shown, allowing the remediation work to be prioritized. Table A, below, illustrates the respective calculation values and ranking.

TABLE A

Example ranking calculation leading us to
a priority remediation order of C, B, A

| Vulnerability | Severity | No. Computers Affected | Overall Vulnerability | Priority Rank |
| --- | --- | --- | --- | --- |
| A | 7 | 10 | 70 | 3 |
| B | 5 | 20 | 100 | 2 |
| C | 6 | 100 | 600 | 1 |

Some CIs (such as computers, mobile devices, and perimeter security devices) have a higher level of business risk associated with them. Examples include the Chief Financial Officer's (CFO) laptop computer, the Chief Executive Officer's (CEO) mobile phone, and the main firewall connecting an e-commerce site to the Internet. If high-level risk markers are not tracked, work that would properly be prioritized (such as handling security vulnerability remediation, or handling security incidents associated with high-risk items) might be left to routine processing, increasing risk, risk exposure, and possible consequences.

In an implementation, providing a designation of certain items as high-risk, supporting a visual indication of high risk items (on both forms and business service maps (BSMs)), and allowing for special handling of severity, criticality, and priority of work items, the problem of un-expedited handling can be solved and the associated risk and exposure reduced.

Configuration items marked as high-risk can receive different treatment in security and risk-related activities. By allowing CIs to be marked as high-risk, different visual cues can be displayed and alternative severity, criticality, and priority values can be assigned to associated risk, security, and other IT activities.

As noted above, a CMDB 180 contains descriptive information and configuration information for CIs. Information stored in the CMDB 180 is persistent, and can be updated by both manual and automated processes. Adding a high-risk indicator to the information stored on CIs makes it possible to provide special treatment to CIs marked as high-risk. This special treatment includes:

Visual cues on forms displaying information about the configuration item

Visual indicators (different background color, blinking text, pulsating concentric rings) on business service maps and network topology displays Modified (higher) severity, criticality, and priority assigned to work items associated with the high-risk CI Security Incident Response tasks Vulnerability remediation tasks Reports of loss or malfunction, which might be nefarious in origin Special care can be prescribed to changes and modifications All the above may be achieved by adding high-risk indicators at the CI level, possibly indicating the risk aspect involved (such as confidentiality, integrity, or availability). The configuration item forms are modified to support high-risk visual indication (such as a banner at the top of the page or a background color change). The visual map display can be modified to support enhanced high-risk indicators. The algorithm used to calculate the severity associated with a vulnerability remediation may be modified to assign higher severity levels to tasks associated with a high-risk configuration item. The algorithm used to assign priority to security incidents may be modified to assign a higher priority to tasks associated with a high-risk configuration item. With the above changes in place, critical work associated with high-risk configuration items can be handled with the alacrity and special attention needed to reduce the impact of problems, incidents, and change.

By way of example, CI A represents the CFO's laptop and is marked as a high-risk item (due to confidentiality concerns). CI B represents Joe Employee's desktop and is not marked as a high-risk item.

When item A is displayed on screen or in a business service map, a visual indication makes it clear, using a feature described above, that the item viewed is a high-risk item. If a vulnerability (associated with software installed on a computer) is associated with both items A and B, the remediation task associated with item A will receive a higher priority as the remediation is associated with higher risk. If both items A and B are lost or stolen, the response to the loss of item A will be assigned a higher severity and criticality compared to item B, due to item A being marked as a high-risk item.

The severity represents a degree of the problem if the attack is successful. The vulnerability, represents a risk of successful attack and taking into account the trust zones and other aspects of the network configuration. Severity calculations can be done in a variety of ways. According to an implementation, an automated, dynamic, and configurable severity calculation may be performed for security incidents using the CMDB 180 or any other configurable, combined factors.

This is very beneficial to a security response team, who will often have a large number of incidents to resolve; some of these will be extremely important, some will be less important, some will have a high risk and must be dealt with carefully, and others are routine. Determining the risk and priority, impact, and severity is not only based on the existence of or potential for a security incident itself, it is also based on the location of the device, problem, or potential problem (e.g., on a highly connected server (high impact) versus on an isolated desktop (low impact), or other criterial relating to the importance of the device (e.g., relating to the CEO and containing highly private data versus a standard employee without access to sensitive data).

The problem (or potential problem) has three elements: first, it is desirable to rapidly prioritize and assess the impact, risk, and severity of each item. This is a task that can take some time as an investigation is performed to see if (using an illustrative example) the load balancer having the problem is a backup development server (not important) versus the core of the company's financial payments processing center (very important). Second, it is desirable to provide some consistency in the prioritization of the incidents or potential problems so that analysts can rely on the priority, impact, risk, and severity to always have the same meaning, e.g., that an incident priority categorized as P1 is less important than an incident priority categorized as P2. Third, it is desirable to provide the information to know what items are more important due to the items' position in the company, regardless of whether it relates to information, a user, or a computer.

By using the information from a security incident (or potential security incident) in combination with information from the CMDB 180 about a computer server, desktop, user or definition of the security incident type, and interrelationships between the affected user, and computer, a security incident response administrator can create severity rules to define the priority, impact, risk, and severity of an incident, aiding in the rapid prioritization and proper handling of the incident. These severity calculator rules may be as simple as basing all these values on a category, or as complicated as a script that determines when and which values to set based on anything in the database.

In the severity calculator, which can run on the security computer 160, the security response management or administration creates severity calculator rules. Each of these has a condition to determine when it applies. When it does apply, it can set the risk, priority, impact, and/or severity of the security incident or potential security incident that it matches. This conditions are customizable based on customers' needs and can be based on the number of computers relying on this CI or based on the combination of factors and values on the incident itself.

Severity calculators may be applied automatically when a new security incident is created (FIG. 9A 915 and see discussion below), and can be run on demand by, e.g., pressing a button, "Calculate Severity" on the security incident form (not shown). When this is done, all of the rules are checked in order, those where the condition matches are run; the first rule that matches the condition will set the desired severity fields to appropriate values.

The condition can dictate a determination of which security incidents should be modified by this rule, and this may be done either via a filter or a script. The filter is a simple search query that works on fields in the security incident or records linked to the security incident with Boolean operators, such as, "category is Malware or opened date is a month ago or user's manager is in the Finance department." For more detail, an advanced condition may also be a script that allows any database fields to be used, as well as far more complex logic querying against any records in the database. The following code snippets provide an example of such complex logic:

```
answer = false;
if (current.cmdb_ci.sys_class_name == 'cmdb_ci_service') {
    var service = new GlideRecord('cmdb_ci_service');
    service.get(current.cmdb_ci);
    if (service.busines_criticality == "1 - most critical" ||
    service.busines_criticality == "2 - somewhat critical")
        answer = true;
}
        Once the condition is true, the values are set. These
values may either be precise, for example:
    Priority=1
    Risk=very high
    Impact=Leave alone (this rule will then not change the impact)
    Severity=1
        Or they may be set by a script that will make use of
additional data and conditionally set the values:
    if (service.busines_criticality == "1 - most critical") {
        current.impact = 1;
        current.risk = 2;
        current.priority = 1;
        current.severity = 1;
    }
    if (service.busines_criticality == "2 - somewhat critical") {
        current.impact = 2;
        current.risk = 3;
        current.priority = 3;
        current.severity = 2;
    }
```

Turning now to the focus of security incident response, the response to security incidents or potential security incidents has often been isolated. Significant improvements in handling such responses can be made by integrating security incident responses with IT systems that provide information about the affected systems, what business services may be affected, related incidents, problems, recent changes, known vulnerabilities, and the people who will be affected, the person to contact for each system. This integration enables more intelligent handling of security incident responses, making appropriate prioritizations, making it easier to find the source of a security incident and resolving it, notifying all people/groups involved, and proper handling of interconnected servers and services.

Traditionally, when a security incident occurs or an identification of a potential security incident is made, there is little context. Although the system where the problem happened or may happen is known, and there may be information and logs providing technical detail of the issue, other vital details required to intelligently handle and prioritize the incident are lacking. This lacking information can include: which user owns that system, whether there is a manager, whether there is a troubleshooting or maintenance team, what business services are using that hardware, whether there are other known issues, whether there were recent changes to that system, if the software on that system has any known vulnerabilities, and what the history is of this machine.

The security incident response mechanisms or security computer 160 and associated software modules/routines are integrated with and receive information from the CMDB in many different ways, and security incident may be created in a number of ways. First, it may be created from an information technology (IT) incident, and the security computer 160 will copy the affected CI data into a security incident data record. Second, it may be created via an event from internal or external sources, and the security computer 160 will pull in the CI data associated with those items identified in the internal or external event source. Third, the security incident may be created manually. In this case the affected CI, and if needed, multiple affected CIs, can be filled in to define the systems that are affected. The requesting user is also a link to a record for that user, as is the affected user. This provides the security incident analyst a massive amount of information right from the start—who owns the affected system, where it is, what software is on it, everything that is known about it.

Figure 4:
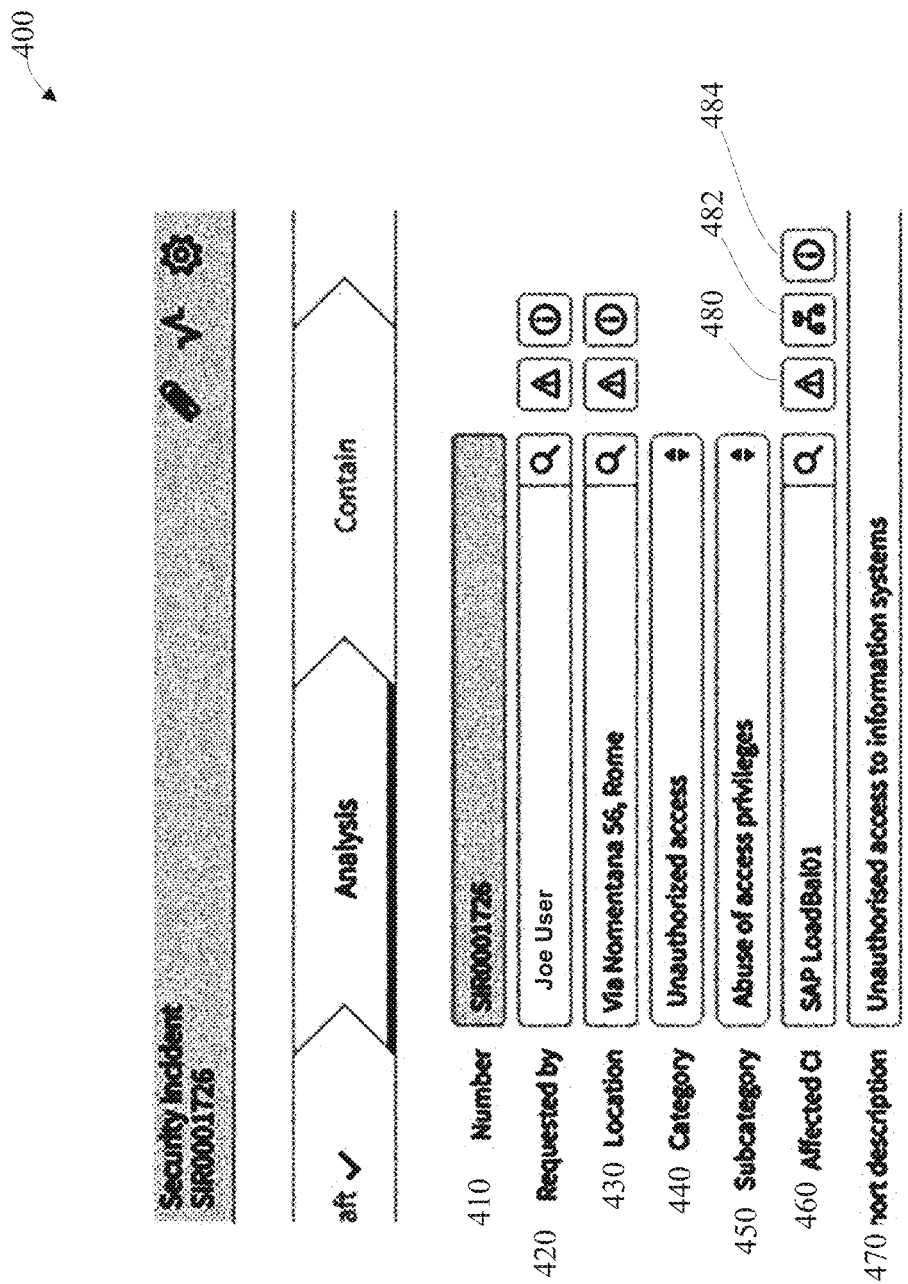
FIG. 4 is an implementation of a screen shot showing a security incident record.

The history and the current state of the system are important since this information contributes to detection of the cause of the problem, determination of incident impact, prioritization, and extent of the problem. FIG. 4 is an implementation of a screen shot showing a security incident record 400. The history and some information about the current state can be provided on a main screen. Shown are an incident identifier or number 410, the requesting user 420, the location of the incident 430, a category 440 and subcategory 450 of the incident, and the affected CI 460, and a short description of the incident 470. Buttons or other indicators may be provided to assist in accessing relevant related information. In an implementation, a related records button (with triangle with an exclamation point) 480 could be provided to indicate the existence of other related records pertaining to the particular field as well as to indicate the existence of other tasks, incidents, changes, problems, or vulnerabilities associated with the record. It can also provide information about other recent problems, change requests, incidents, security incidents, and known vulnerabilities on that system (server/laptop/etc.). This can help indicate if a recent change is possibly part of the problem, or if the vulnerabilities on the system match an exploit that fits the current security incident, providing an easy fix and allowing a rapid patch of the vulnerability. A service map button 482 could be provided to show other related CI elements in a graphical form, such as relationships between a given server and other servers, load balancers, databases, what business services it supports (e.g., payroll, corporate website, etc.), as well as incidents, problems, changes, security incidents and vulnerabilities for all of the related devices. This provides additional helpful data to find issues, determine how something got in and what needs to be fixed. An information button 484 could be provided to access help or other information providing context to the data in the field. It allows access to additional information about that CI, including ownership, management, and change history information, and opens the record for the server.

FIG. 5 is an implementation of a screen shot showing records related to a selected CI, which could be displayed by selecting the related records button 480. The display provides a related issues list 500 of all recent or active problems, incidents, changes, vulnerabilities, and other security incidents on the same CI that are found and displayed. In the instance shown, clicking on the related records button 480 reveals a recent update to the system 510 and another security incident 520 active at the same time. It also provides a listing of related vulnerable items 530.

This information helps to coordinate with the other open security incidents, spot recent changes that could indicate a problem, and find a known vulnerability that may be being exploited. The related issues list 500 is a list of all of these types of records that are currently open or were open within some designated time period (e.g., the last month).

Figures 6, 7:
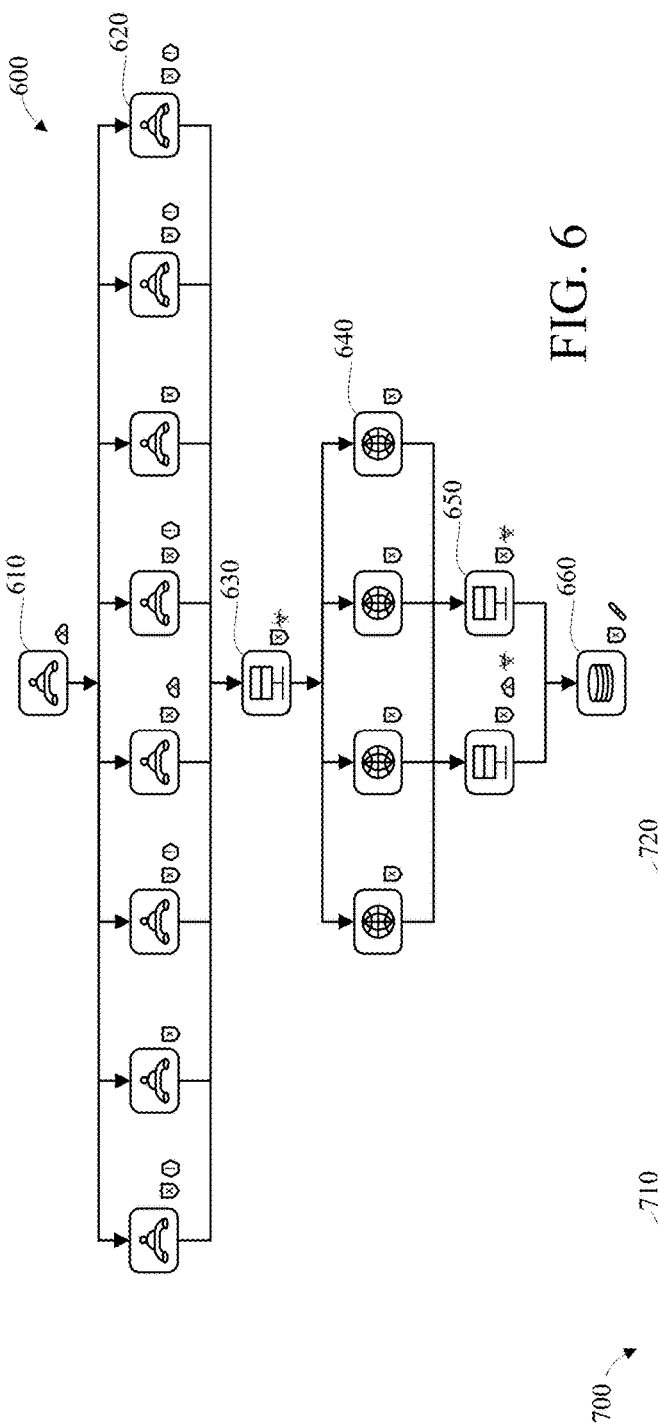
FIG. 6 is a hierarchical block diagram illustrating an implementation of a service map.
FIG. 7 is an implementation of a screen shot showing further records related to a selected CI.

FIG. 6 is a hierarchical block diagram illustrating an implementation of a service map. For more information, the business service management map (service map) 600 is displayed to provide information not only about the particular CI being investigated, but about everything linked to it. It shows important business services that can be affected, and also provides an insight into any similar problems in similar systems. By way of example, the service map 600 shows, at the top, an icon 610 representing a business services SAP enterprise server; in the next row, it shows icons 620 representing business services SAP servers for human resources, labor, financial, plant, configuration, payroll, materials, and sales. In the next row, it shows an icon 630 for a load balancing server. In the next row, it shows icons 640 representing various web servers; in the next row, it shows icons 650 representing application servers; and in the bottom row, it shows an icon 660 representing a database.

The service map 600 map may be opened by clicking a button 482 beside the CI record 400 displayed on the screen. Linking the security incident to the CI and then providing visibility into all of the interrelated information allows a much more intelligent and rapid solution to problems, as well as a great deal of insight into the risk related to modifying, e.g., a key server.

FIG. 7 is an implementation of a screen shot showing further records 700 related to a selected CI. When the issue is found, links within the security incident enable creating change requests and problems as well as displaying information about the CI to help to notify the correct people, get the needed approvals and access for any sensitive servers. The view in FIG. 7 is an incident-focused view created by selecting the incident button/tab 710. However, the records can also be viewed with a problem focus, security incident focus, or vulnerable item focus.

Figure 8:
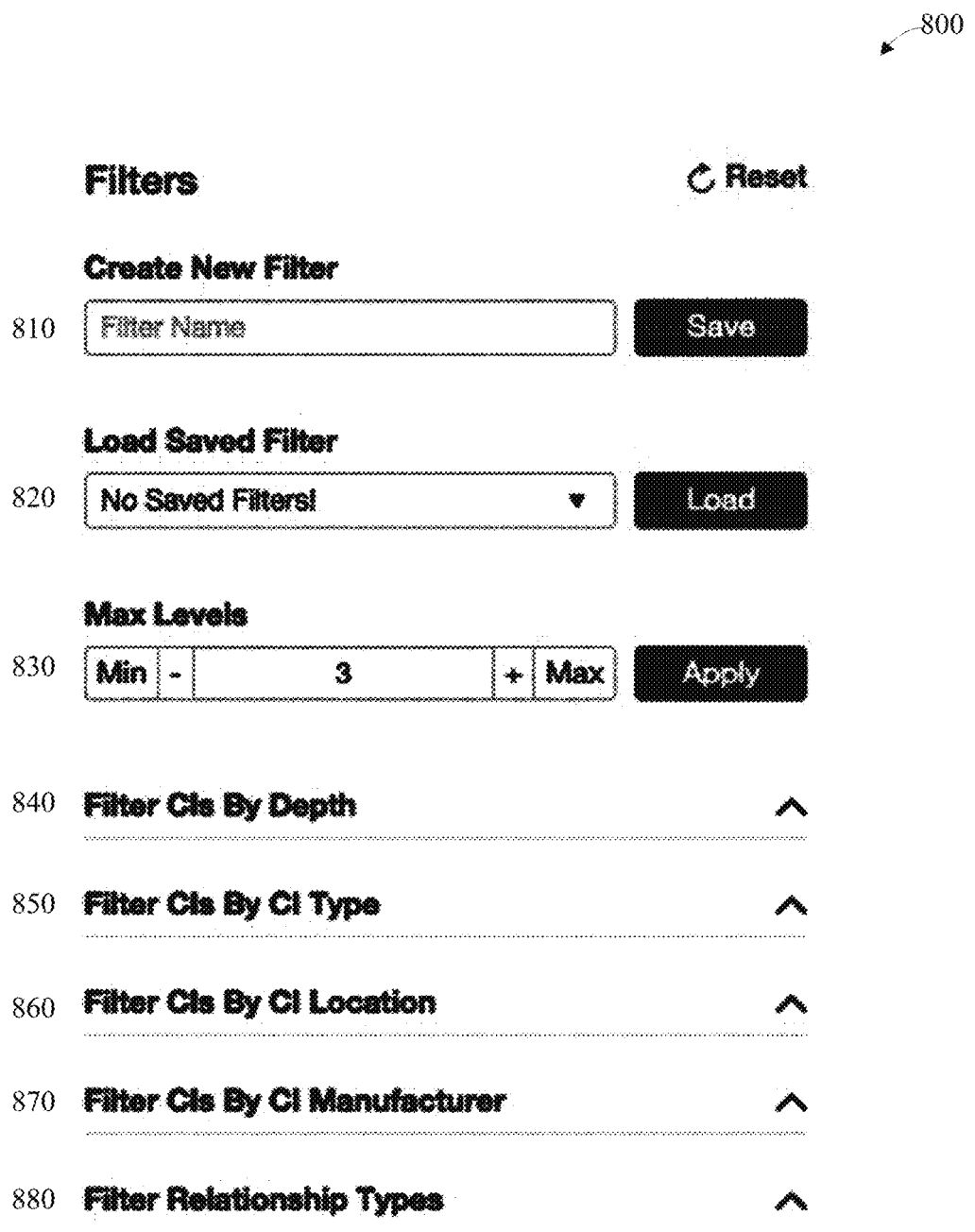

FIG. 8 is an implementation of a screen shot showing a filter 800 that can be applied to the displayed records in order to simplify them or focus on a particular aspect/feature. A name 810 can be provided for the filter so that it can be saved off and loaded 820 at a later time. The user can specify the number of levels 830 for relationships that are to be displayed, and the CIs can be filtered by depth (number of "jumps" or "hops" distance from the main CI to display) 840, type 850, location 860, manufacturer 870, and relationship types 880. These filters may be used to control how much information is pulled into the CI map. As previously noted, the depth provides how many links away from the central CI to show. The type allows filtering by type of element—for instance, one could select servers, but not laptops and routers, or by load balancers, application servers, databases, etc. The filter allows a selection of multiple types and can be used to filter out unwanted elements such as network components. Relationship types indicates how two items are related, e.g., is one used by, is the database for, is required by, is optionally used, is managed by, etc. The platform supports displaying multiple type of relationships. A "uses:used by" relationship indicates that a CI is using another CI or is being used by another CI (the relationship is directional). A relationship such as "virtualizes:virtualized by" indicates a CI is a virtual CI and connects it to the physical CI used to host it. A relationship such as "powers: powered by" indicates the power source for a CI. The filter 880 is used to select the type of relationships to display, allowing the user to focus only on the relationship types relevant to them.

A vulnerability manager that utilizes the above tools can provide improved handling and prioritization of vulnerabilities found within the corporate network utilizing system information from the CMDB and software discovery tools, tracking problems linked to a security incident response, and managing resolution via change requests and problems.

As discussed above, even if a vulnerability scanner and vulnerable software lists provide information about all known vulnerabilities within a system, they are not effective at prioritizing vulnerability resolution and they lack an ability to properly gauge impact within an organization. Furthermore, they do not have an effective means to collaborate with a security incident response team if a vulnerability is exploited.

The provision of a vulnerability management application that has a deep integration with the CMDB and security incident response application can greatly assist in prioritizing and resolving security incidents. By integrating with these systems, a vulnerability manager can target vulnerabilities that may impact critical business systems or infrastructure, or take into account the users most affected by a vulnerability. The integration also provides the ability to escalate vulnerabilities to the security incident response team, and ensures that vulnerability response goes through a proper change or problem management workflow.

When a vulnerability is found by a vulnerability scanner, instead of providing a shallow view of the software on a piece of hardware, the above tools with the integration of the CMDB provides rich context for analyzing the potential impact of a vulnerability. The CI provides useful data such as business services and other hardware that depend on this CI, as well as contact information to assist with remediation of the vulnerability (e.g., contact information for the user, manager, etc.). The business service management map 600 provides a visual representation of the configuration item and its connections, and provides the ability to show other vulnerabilities, as well as vulnerabilities for other connected servers. This provides a quick view to assess the impact of a vulnerability, and take steps needed to resolve.

If a security incident occurs on the system with the vulnerability, the vulnerability can be easily viewed the from the security incident display, which provides a view for vulnerability managers to let them know that a particular vulnerability is causing problems, as well as providing a security analyst with a possible cause and solution for their incident. Similarly, if a vulnerability should to be treated as a security incident, such as if the vulnerability may have already been exploited, then the vulnerability discoverer/reviewer can create a security incident in a single action, such as a mouse click, which allows for immediate investigation by the security incident response team. For vital servers, a change request provides a managed process to update a server, with approvals, notification, and validation that the update was completed successfully. Creating a problem incident provides a simpler upgrade path for less vital systems.

Figure 9A:
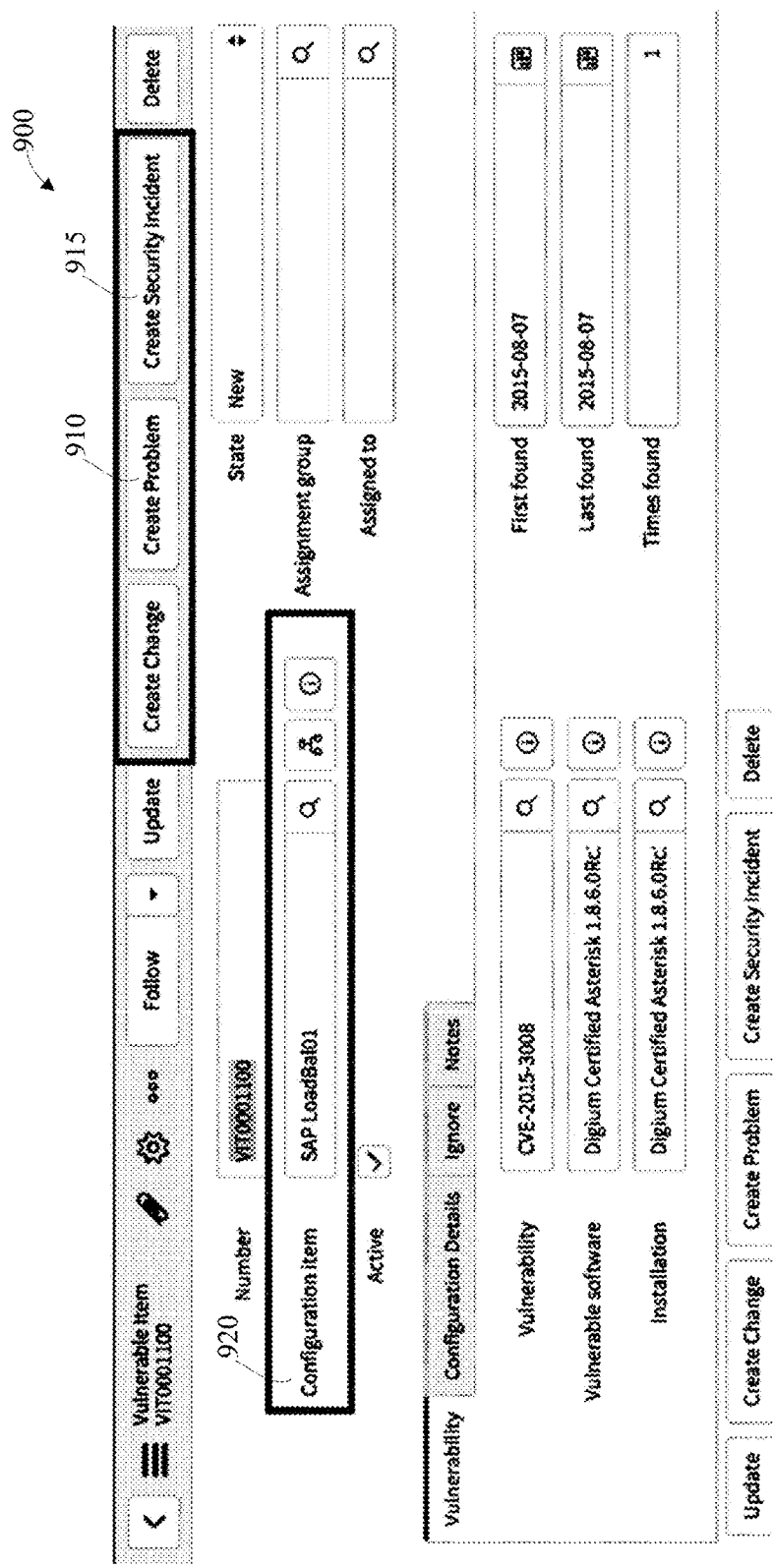
FIGS. 9A and 9B are portions of an implementation of a vulnerable item display/form.
Figure 9B:
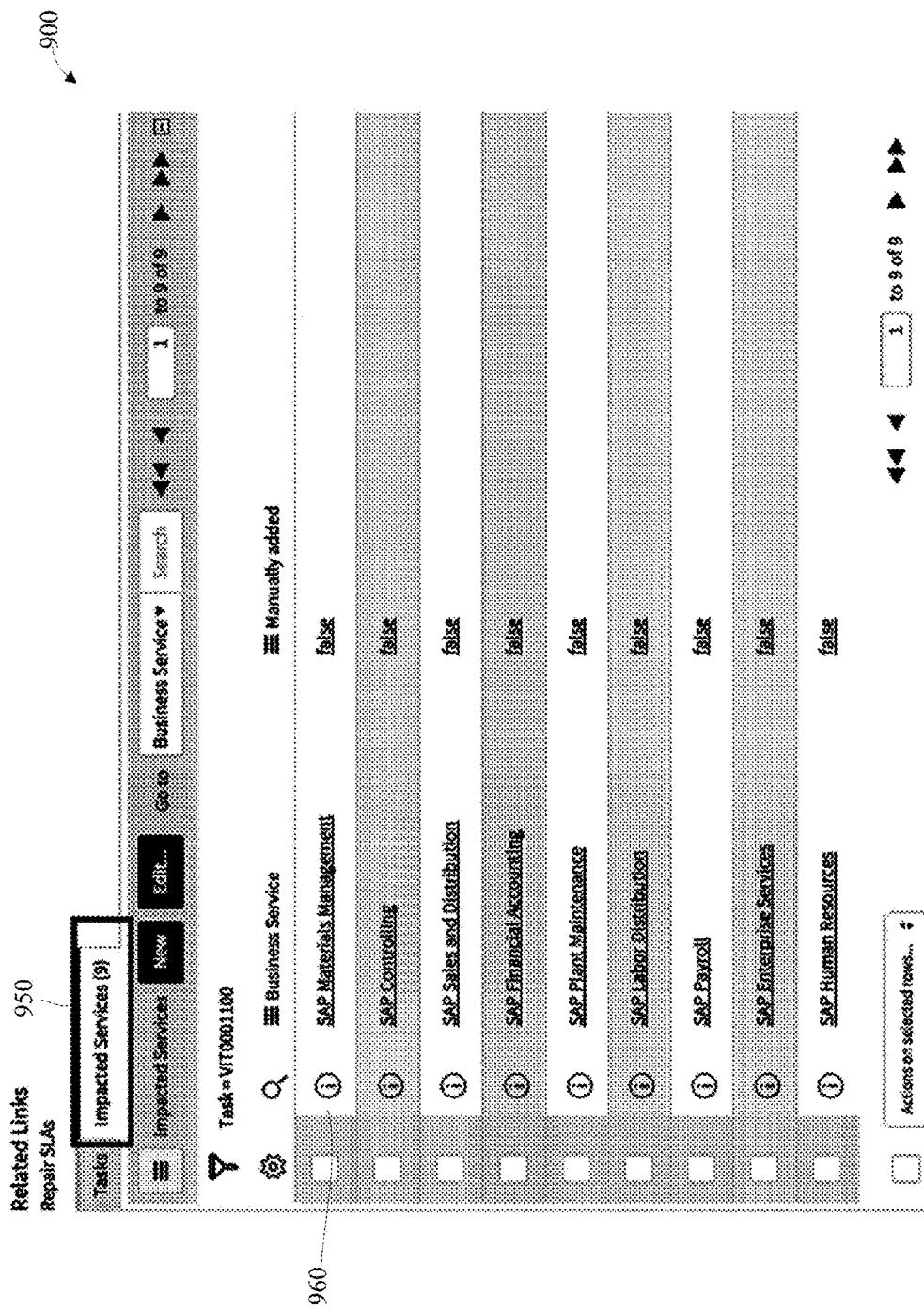

FIGS. 9A and 9B, which are portions of a vulnerable item display/form 900, illustrate how a single user action, such as a mouse click on a button, can create a change 905, a problem (incident) 910, or a security incident 915 for a particular CI 920. As illustrated in FIG. 9A, the CI is the load balancer 630. Selecting the impacted services tab 950 the provides a list 960 of the various SAP servers 620 that are impacted. The business service management map 600 may also be displayed, highlighting a vulnerable configuration item, which demonstrates the quick ability to visually see the possible impact of this server being down, as well as see other related vulnerabilities, incidents, and problems.

When creating a problem, change, or security incident from the vulnerability list view, a vulnerability analyst can ensure that all configuration items are captured in as an affected CI. FIGS. 9A and 9B show the ease of creating a problem, change, and security incident from the main form, as well as the ability to drill into the configuration item details, and see the impacted services for the affected configuration item)

FIG. 10 is an implementation of a screen shot showing further records related to a selected CI, similar to that shown in FIG. 7, that can be displayed with the business service management map 600, but with a selection of a vulnerable item 720 to be displayed.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "including," or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
   receiving, at a computing system monitoring a network, vulnerability data from an external source;
   identifying, by the computing system using configuration item data stored in a configuration management database (CMDB) and the vulnerability data, configuration items in the network impacted by a vulnerability;
   identifying, using the CMDB, a network topology based upon relationships between the identified configuration items and one or more perimeter defense components, a physical location of the configuration items, or both;
   calculating, by the computing system, an original risk for each configuration item in the network impacted by the vulnerability based on the configuration item data stored in the CMDB and the vulnerability data;
   calculating, by the computing system, a context dependent risk for each configuration item in the network impacted by the vulnerability based on the original risk, the network topology, the one or more perimeter defense components, and the configuration item data stored in the CMDB; and
   initiating, by the computing system, a remediation process for the identified configuration items based on the calculated context dependent risks.

2. The method of claim 1, wherein the network topology represents trust zone data for configuration items in the network.

3. The method of claim 2, wherein the trust zone data indicates a delineation of a given configuration based on risk in light of attack vectors.

4. The method of claim 2, wherein the trust zone data further includes data representing routers and other perimeter defense components in the network.

5. The method of claim 2, wherein the trust zone data is defined by other network components associated with a given configuration item.

6. The method of claim 1, wherein receiving vulnerability data from the external source comprises:
    receiving vulnerability data that includes National Institute of Standards and Technology National Vulnerability Database data.

7. The method of claim 1, wherein calculating the context dependent risk for each configuration item of the identified configuration items based on network topology and the configuration item data stored in the CMDB comprises:
    calculating the context dependent risk for a given configuration item based on a user of the given configuration item.

8. The method of claim 1, wherein calculating the context dependent risk for each configuration item of the identified configuration items based on network topology and the configuration item data stored in the CMDB comprises:
    calculating the context dependent risk for a given configuration item based on access to the physical location of the given configuration item.

9. The method of claim 1, wherein calculating the context dependent risk for each configuration item of the identified configuration items based on network topology and the configuration item data stored in the CMDB comprises:
    calculating the context dependent risk for a given configuration item based on connections between the given configuration item and other configuration items in the network.

10. A system, comprising:
    a processor;
    a non-transitory memory, configured to store instructions, that when executed by the processor, cause the system to perform functions comprising:
        receiving vulnerability data from an external source;
        identifying, using configuration item data stored in a configuration management database (CMDB) and the vulnerability data, configuration items in a network impacted by a vulnerability;
        identifying, using the CMDB, a network topology based upon relationships between the identified configuration items and one or more perimeter defense components, a physical location of the configuration items, or both;
        calculating an original risk for each configuration item in the network impacted by the vulnerability based on the configuration item data stored in the CMDB and the vulnerability data;
        calculating a context dependent risk for each configuration item in the network impacted by the vulnerability based on the original risk, the network topology, the one or more perimeter defense components, and the configuration item data stored in the CMDB; and
        initiating a remediation process for the identified configuration items based on the calculated context dependent risks.

11. The system of claim 10, wherein the network topology represents trust zone data for configuration items in the network.

12. The system of claim 11, wherein the trust zone data indicates a delineation of a given configuration based on risk in light of attack vectors.

13. The system of claim 11, wherein the trust zone data further includes data representing routers and other perimeter defense components in the network.

14. The system of claim 11, wherein the trust zone data is defined by other network components associated with a given configuration item.

15. The system of claim 10, wherein calculating the context dependent risk for each configuration item of the identified configuration items based on network topology and the configuration item data stored in the CMDB comprises:
    calculating the context dependent risk for a given configuration item based on data contained within a security incident record.

16. The system of claim 10, wherein calculating the context dependent risk for each configuration item of the identified configuration items based on network topology and the configuration item data stored in the CMDB comprises:
    calculating the context dependent risk for a given configuration item based on access to the physical location of the given configuration item.

17. The system of claim 10, wherein the functions further comprise:
    storing the context dependent risk and an inherent risk for a given configuration item in memory, wherein the inherent risk for the given configuration item is indicated in the vulnerability data from the external source.

18. A non-transitory computer-readable storage medium, comprising executable instructions that, when executed by a processor, facilitate performance of operations comprising:
    receiving vulnerability data from an external source;
    identifying, using configuration item data stored in a configuration management database (CMDB) and the vulnerability data, configuration items in a network impacted by a vulnerability;
    identifying, using the CMDB, a network topology based upon relationships between the identified configuration items and one or more perimeter defense components, a physical location of the configuration items, or both;
    calculating an original risk for each configuration item in the network impacted by the vulnerability based on the configuration item data stored in the CMDB and the vulnerability data;
    calculating a context dependent risk for each configuration item in the network impacted by the vulnerability based on the original risk, the network topology, the one or more perimeter defense components, and the configuration item data stored in the CMDB; and
    initiating a remediation process for the identified configuration items based on the calculated context dependent risks.

19. The non-transitory computer-readable storage medium of claim 18, wherein the network topology represents trust zone data for configuration items in the network.

20. The non-transitory computer-readable storage medium of claim 19, wherein the trust zone data indicates a delineation of a given configuration based on risk in light of attack vectors.

* * * * *